United States Patent [19]

Sawazaki

[11] 4,422,106

[45] Dec. 20, 1983

[54] MAGNETIC TRANSCRIPTION-RECORDING METHOD

[75] Inventor: Norikazu Sawazaki, Kawasaki, Japan

[73] Assignee: Tokyo Shibaura Denki Kabushiki Kaisha, Kawasaki, Japan

[21] Appl. No.: 243,909

[22] PCT Filed: Jul. 1, 1980

[86] PCT No.: PCT/JP80/00153

§ 371 Date: Jul. 27, 1981

§ 102(e) Date: Feb. 26, 1981

[87] PCT Pub. No.: WO81/00165

PCT Pub. Date: Jan. 22, 1981

[30] Foreign Application Priority Data

Jul. 2, 1979 [JP] Japan .................................. 54-82609
Sep. 13, 1979 [JP] Japan .................................. 54-116767

[51] Int. Cl.³ .............................................. G11B 5/86
[52] U.S. Cl. .................................................... 360/17
[58] Field of Search ............................ 360/17, 16, 4

[56] References Cited

U.S. PATENT DOCUMENTS 2,894,798 7/1959 Potter ..................................... 360/4
3,554,798 1/1971 Nacci ................................ 360/16 X

OTHER PUBLICATIONS

IBM/TDB vol. 23, No. 2, Jul. 1980, p. 843 "Magnetic Video Disk . . ." by Lean.

*Primary Examiner*—John H. Wolff
*Attorney, Agent, or Firm*—Oblon, Fisher, Spivak, McClelland & Maier

[57] ABSTRACT

A magnetic transcription-recording method, in which the magnetic material layer (5) of a magnetic recording medium (4) is brought into contact with the magnetic material layer (2) of a master recording medium (1) having information signals such as audio signals or video signals recorded therein in a concave-convex pattern, and a magnetic field is applied to the master recording medium (1) and the magnetic recording medium (4) so as to transcribe and record magnetically the information signals in the magnetic material layer (5) of the magnetic recording medium (4), characterized in that the information signals are recorded at a high density in a concave-convex pattern in the magnetic material layer (2) of the master recording medium (1).

9 Claims, 9 Drawing Figures

A magnetic recording-reproducing system is popular in this field as a recording-reproducing system of information signals such as audio signals or video signals. However, the conventional magnetic recording-reproducing system is defective in that it is difficult to achieve a high recording density and a sufficiently high SN ratio.

A magnetic transcription-recording method is also known to the art as a method of rapidly reproducing from a single master recording medium the magnetic recording medium used in the magnetic recording-reproducing system. In the conventional magnetic transcription-recording method, the magnetic material layer of a magnetic recording medium is brought into contact with the magnetic material layer of a master recording medium having information signals recorded therein. Under this condition, a magnetic field is applied to these recording media so as to magnetically transcribe and record the information signals in the magnetic material layer of the magnetic recording medium. In the conventional method, however, the magnetic layer of the master recording medium has a smooth surface, with the result that slippage tends to occur during the transcription-recording operation between the two magnetic material layers. Naturally, the slippage deteriorates the information signals recorded in the recording medium, rendering it difficult achieve a satisfactory transcription-recording. For example, the SN ratio is lowered and cross-talk is generated between the recorded signals, particularly where the recording density is high.

Recently, a video disc has been developed, in which information signals are recorded by using laser beams or electron beams in a disc-shaped recording medium in a pattern of projections, hereinafter referred to as concave-convex pattern, and the recorded signals are reproduced mechanically electrostatically or optically. The video disc is approaching the stage of practical use. The recent machining technique using laser or electron beams permits forming a very fine concave-convex pattern of submicron order. Thus, the video disc permits achieving an extremely high recording density and also permits sufficiently increasing the SN ratio of the reproduced signals. In addition, the video disc can be readily reproduced from a single master disc by a pressing method.

However, a special apparatus is required for reproducing the information signals recorded in the video disc in a concave-convex pattern, whether the information signals are reproduced mechanically, electrostatically or optically. In addition, the reproducing apparatus is costly, compared with the magnetic reproducing apparatus popular in this field. What is more important is that some technical problems remain unsolved in the reproducing apparatus of a video disc, rendering it impossible to reproduce the recorded information signal stably and without fail.

To be brief, it is practically desirable to use a magnetic reproducing apparatus utilizing a simple magnetic head, which is widely employed nowadays and has already been technically accomplished. Thus, it is a matter of serious concern in this field to develop a magnetic recording medium capable of recording information signals at a high density and permitting the recorded information signal to be reproduced by a simple magnetic reproducing apparatus.

It should also be noted that the video disc described above is for reproduction alone. In contrast, the magnetic recording medium is capable of erasing the recorded information signal and recording again optional signals.

An object of this invention is to provide a magnetic transcription-recording method for reproducing from a single master recording magnetic recording media each capable of recording information signals at a high density, capable of permitting the recorded information signal to be reproduced by a magnetic reproducing apparatus, and capable of optically erasing the recorded information signal and recording again new information signals.

DISCLOSURE OF INVENTION

According to this invention, there is provided a transcription-recording method, in which the magnetic material layer of a magnetic recording medium is brought into contact with the magnetic material layer of a master recording medium having information signals recorded therein in a concave-convex pattern, followed by applying a magnetic field to the system consisting of the master recording medium and the magnetic recording medium so as to magnetically transcribe and record the information signals in the magnetic material layer of the magnetic recording medium, characterized in that the information signals are recorded in the magnetic material layer of the master recording medium in the form of a concave-convex pattern.

To be more specific, the master recording medium used in this invention comprises a magnetic material layer. As in a video disc, information signals are recorded at a high density in the magnetic material layer in the form of a concave-convex pattern. On the other hand, the magnetic recording medium in which the information signals recorded in the master recording medium are transcribed and recorded comprises a magnetic material layer having a smooth surface like the magnetic disc or magnetic tape used in an ordinary magnetic recording-reproducing system. The magnetic recording medium is disposed on the master recording medium such that the magnetic material layer of the former is in direct contact with the magnetic material layer of the latter. Under this condition, a magnetic field is applied to the master recording medium and the magnetic recording medium.

It is possible to apply either a D.C. magnetic field or an A.C. magnetic field. Further, both D.C and A.C. magntic fields can be used in combination. It should be noted that, where an A.C. magnetic field is used mainly, it is necessary for the magnetic material layer of the master recording medium to be uniformly magnetized in advance in its thickness direction in a predetermined polarity. The magnetic field may be applied either in the thickness direction of the recording medium or in the planar direction, i.e., direction perpendicular to the thickness direction. It is also possible to apply a D.C. magnetic field in the thickness direction and an A.C. magnetic field in the planar direction.

The application of magnetic field permits the magnetic material layer of the magnetic recording medium to be selectively magnetized in a manner to form a magnetization pattern conforming with the concave-convex pattern formed in the magnetic material layer of the master recording medium, thereby achieving the desired magnetic transcription-recording.

This invention permits providing a magnetic recording medium substantially equal to the conventional video disc in density of the recorded information signals. Naturally, the magnetic recording medium provided by this invention is markedly superior in the recording density of information signals to the conventional magnetic disc or magnetic tape in which information signals are recorded by a magnetic head. Nevertheless, the information signal recorded in the magnetic recording medium can be readily reproduced by using a magnetic head-based reproducing apparatus as in the conventional magnetic disc or magnetic tape. Also, unlike the conventional video disc, the magnetic recording medium provided by this invention permits optionally erasing the recorded information signals and recording again new information signals. Further, a concave-convex pattern is formed in the magnetic material layer of a master recording medium, with the result that the magnetic material layer of a magnetic recording medium is brought into stable contact with the magnetic material layer of the master recording medium. Naturally, slippage does not occur between the contact surfaces of the two magntic materal layers, leading to an improved quality of the information signal recorded in the magnetic material layer of the magnetic recording medium. What should also be noted is that the information signal recorded in the form of a concave-convex pattern in the magnetic materal layer of the master recording medium is free from deterioration with time unlike the information signal magnetically transcription-recorded in the magnetic material layer of the master magnetic recording medium used in the conventional magnetic transcription-recording method. It follows that the master recording medium of this invention can be used quite many times for the transcription-recording purpose.

BEST MODE OF CARRYING OUT THE INVENTION

Let us describe in detail this invention with reference to the accompanying drawings.

Figure 1:
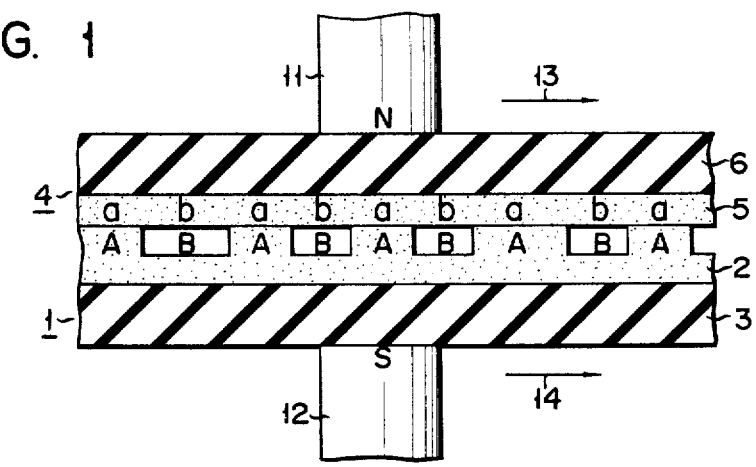
FIG. 1 is a sketch for explaining a magnetic transcription-recording method according to a first embodiment of this invention.

FIG. 1, which is intended to explain a first embodiment of this invention, partly shows the cross section of recording media in the longitudinal direction of the recording track. A master recording medium 1 comprises a magnetic material layer 2 having information signals recorded therein in a concave-convex pattern. The magnetic material layer 2 is formed, as required, on the surface of a base layer 3. The master recording medium 1 is of, for example, disc shape or tape shape. If the master recordig medium 1 is of disc shape, the magnetic material layer 2 is formed along the recording track extending in the circumferential direction of the disc. If the master recording medium 1 is of tape shape, the magnetic material layer 2 is formed along the recording track extending in the longitudinal direction of the tape or along the recording track obliquely extending relative to the longitudinal direction of the tape.

The information signals can be recorded in the magnetic material layer 2 of the master recording medium 1 in a concave-convex pattern by employing, for example, the video disc manufacturing technique. Specifically, a concave-convex pattern representing the information signals is formed in the base plate by utilizing a laser light or electron beam, followed by coating the pattern-bearing surface of the base plate with a magnetic material layer so as to form the magnetic material layer 2 bearing the concave-convex pattern on the surface. Alternatively, the magnetic material layer 2 may be prepared by the pressing, with concave-convex pattern-bearing base plate used as a press plate.

A magnetic recording medium 4 consists of a base layer 6 and a magnetic material layer 5 having a smooth surface and coated on the surface of the base layer 6. The magnetic material layer 5 is formed by coating the surface of the base layer 6 with a powdery magnetic material.

For performing the magnetic transcription-recording operation, the surface of the magnetic material layer 5 of the magnetic recording medium 4 is brought into contact with the surface of the magnetic material layer 2 of the master recording medium 1, said layer 2 having the information signals recorded on the surface in a concave-convex pattern. Also, magnets 11 and 12 are disposed in a manner to face each other with the master recording medium 1 and the magnetic recording medium 4 sandwiched therebetween. The polarities of the mutually facing magnetic poles of the magnets 11 and 12 are opposite to each other. The magnetic field produced by the magnets 11, 12 is applied in the thickness direction of the master recording medium 1 and the magnetic recording medium 4. Both the master recording medium 1 and the magnetic recording medium 4 are moved relative to the magnets 11 and 12 in the longitudinal direction of the recording track, with the magnetic material layers 3 and 5 kept in mutual contact, as denoted by arrows 13 and 14.

If, for example, N-pole of the magnet 11 faces the S-pole of the magnet 12 as shown in the drawing, the magnetic material layer 5 is magnetized such that the surface region of the layer 5 bears the N-polarily. It should be noted, however, that a region a (i.e., the portion facing the convex portion A of the magnetic material layer 2) of the magnetic material layer 5 strongly contacts the surface of the magnetic material layer 2. On the other hand, a gap corresponding to the depth of the concave portion A is provided between a region b (i.e., the portion facing the concave portion B of the magnetic material layer 2) of the magnetic material layer 5 and the surface of the magnetic material layer 2. Thus, the D.C. magnetic field generated by the magnets 11 and 12 acts strongly to the region a and weakly to the region b of the magnetic material layer 5. As a result, the regions a and b are magnetized strongly and weakly, respectively. In other words, the magnetic material layer 5 is magnetized in a manner to form a magnetization pattern conforming with the concave-convex pattern formed in the magnetic material layer 2. In this fashion, the information recorded in the concave-convex pattern in the magnetic material layer 2 of the master recording medium 1 is magnetically transcribed and recorded in the magnetic material layer 5 of the magnetic recording medium 4.

Figure 2:
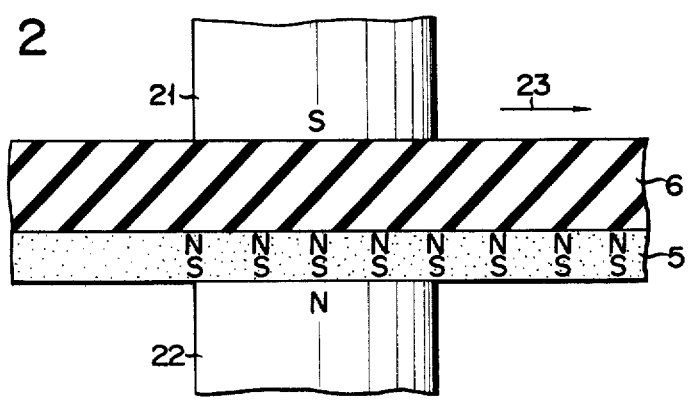
FIG. 2 is a sketch for explaining the pretreating step of the magnetic recording medium used in the first embodiment shown in FIG. 1.

In the embodiment described above, it is more desirable to have the magnetic material layer 5 of the magnetic recording medium 4 uniformly magnetized in polarity opposite to that achieved by the magnets 11 and 12 shown in FIG. 1 before the transcription-recording operation. Specifically, magnets 21 and 22 are disposed in a manner to face each other, with the magnetic recording medium 4 sandwiched therebetween such that the S-pole of the magnet 21 contacts the base layer 6 and the N-pole of the magnet 22 contacts the magnetic material layer 5 of the magnetic recording medium 4, as shown in, for example, FIG. 2. In this fashion, a D.C. magnetic field opposite in polarity to that produced by the magnets 11 and 12 is applied to the magnetic material layer 5. Under this condition, the magnetic recording medium 4 is moved relative to the magnets 21 and 22 in the direction denoted by an arrow 23. As a result, the magnetic material layer 5 is uniformly magnetized such that the front and back surfaces thereof exhibit the S- and N-polarities, respectively.

The powdery magnetic material forming the magnetic material layer 5 may be oriented in the thickness direction of the magnetic material layer 5 or in the direction perpendicular to the thickness direction, i.e., the planar direction of the magnetic material layer 5. But, the powdery magnetic material mentioned should desirably be oriented in the thickness direction so that the magnetic material layer 5 may be easily magnetized in the thickness direction.

Figure 3:
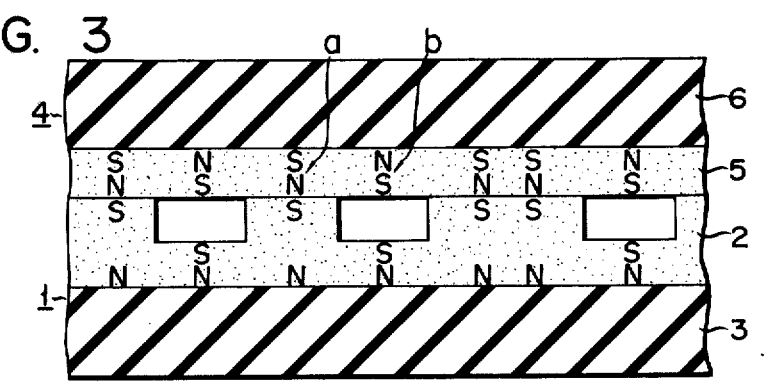
FIG. 3 is a sketch for explaining how information signals are transcription-recorded in the magnetic recording medium in the first embodiment mentioned.

After the pretreatment described above, the transcription-recording operation is applied to the magnetic recording medium 4 as described previously with reference to FIG. 1. FIG. 3 shows how the magnetic material layer 5 is magnetized after the transcription-recording operation. Specifically, the polarity of the region b is kept unchanged after application of the D.C. magnetic field produced by the magnets 11, 12 to the magnetic material layer 5. But, the polarity of the region a is reversed. It follows that the magnetic material layer 5 is finally magnetized such that the front surfaces of the regions a and b exhibit the N- and S-polarities, repsectively. In this fashion, the magnetic material layer 5 is allowed to bear magnetized patterns of S- and N-polarities as in the ordinary magnetic recording system so as to perform the transcription-recording efficiently. Thus, it is possible to reproduce the signals large in amplitude and high in SN ratio.

As described above, the magnetic transcription-recording method of this invention permits magnetically transcribing and recording the information, which is recorded at a high density in the magnetic material layer of the master recording medium in a concave-convex pattern, in the smooth magnetic material layer of the magnetic recording medium. The recording density of the magnetic recording medium achieved in this invention is substantially equal to that of the conventional video disc and is markedly higher than that of the ordinary magnetic disc or magnetic tape in which the information signals are magnetically recorded by means of a magnetic head.

In addition, the information signals are magnetically recorded in this invention on the smooth surface of the magnetic material layer as in the ordinary magnetic disc or magnetic tape. Thus, it is possible to use a simple magnetic reproducing apparatus, which involves a magnetic head and has already been technically accomplished, for reproducing the information signals recorded in the magnetic recording medium, rendering it unnecessary to use such a special reproducing apparatus as used in the conventional video disc.

Further, it is possible to erase easily the signals recorded in the magnetic recording medium by using the ordinary magnetic recording-reproducing apparatus and, then, to record optionally the new information signals in the magnetic recording medium. Thus, the magnetic recording medium of this invention is advantageous in economy over the conventional video disc.

As a magntic transcription-recording method, it is known to the art that a non-recorded magnetic tape is superposed on a master magnetic tape having information signals recorded therein by using a magnetic head, followed by applying a magnetic field to the superposed magnetic tapes for performing the desired transcription-recording. In this method, however, slippage tends to occur between the two magnetic tapes because each of the two tapes has a smooth surface, rendering it difficult to perform the transcription-recording accurately. In contrast, the magnetic transcription-recording method of this invention utilizes a master recording medium having a concave-convex pattern formed in the magnetic material layer. Thus, slippage is unlikely to occur even if the recording media are moved with the two magnetic material layers kept in mutual contact. It follows that this invention permits stably performing the transcription-recording of high quality signals while suppressing the decrease of SN ratio and generation of cross-talks.

Figure 4:
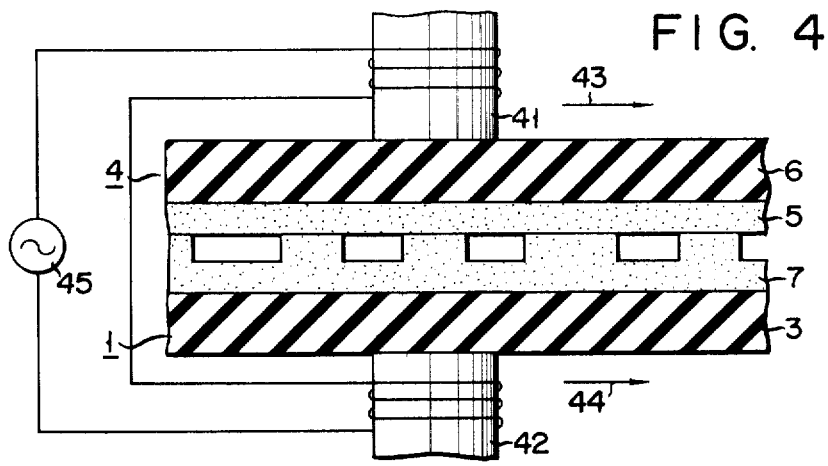
FIG. 4 is a sketch for explaning a magnetic transcription-recording method according to a second embodiment of this invention.
Figure 5:
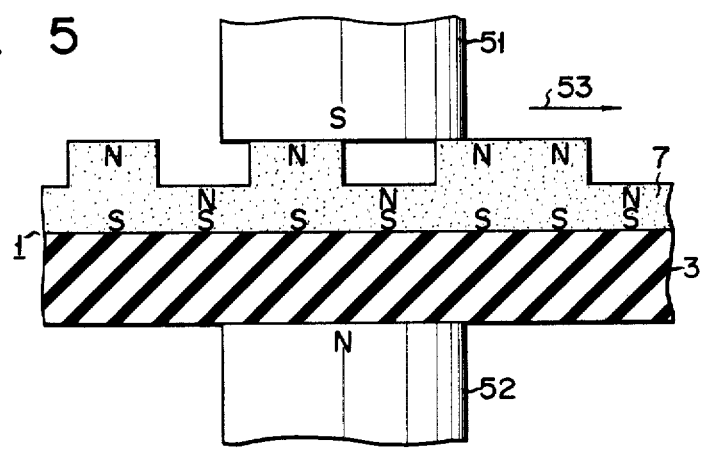
FIG. 5 is a sketch for explaning the pretreating step of the master recording medium used in the second embodiment shown in FIG. 4.

FIG. 4 is intended to explain a second embodiment of this invention. In this embodiment, the master recording medium 1 comprises a magnetic material layer 7 formed of a ferromagnetic material (i.e., material exhibiting permanent magnet properties and having a large coercise force) such as samarium-cobalt or barium ferrite. Information signals are recorded in the magnetic material layer 7 in a concave-convex pattern as in the first embodiment. Also, the magntic material layer 7 is uniformly magnetized in advance in the thickness direction in a predetermined polarity. To this end, magnets 51 and 52 are disposed in a manner to face each other, with the master recording medium 1 sandwiched therebetween such that the S-pole of the magnet 51 contacts the magnetic material layer 7 and the N-pole of the magnet 52 contacts the base layer 3 of the master recording medium 1, as shown in, for example, FIG. 5. Thus, a D.C. magnetic filed is applied in the thickness direction of the magnetic material layer 7. Under this condition, the master recording medium 1 is moved relative to the magnets 51 and 52 in the longitudinal direction of the recording track as denoted by an arrow 53. As a result, magnetic material layer 7 is uniformaly magnetized such that the front and back surfaces thereof exhibit the N- and S-polarities, respectively.

In the second embodiment, an A.C. magnetic field is utilized for performing the transcription-recording. Specifically, the smooth surface of the magnetic material layer 5 included in the magnetic recording medium 4 is brought into contact with the surface of the magnetic material layer 7 of the master recording medium 1. Also, electromagnets 41 and 42 are disposed to face each other, with the master recording medium 1 and the magnetic recording medium 4 intervening therebetween such that the base layers 6 and 3 are in contact with the electromagnets 41 and 42, respectively. The electromagnets 41 and 42 are supplied with an A.C. current from an A.C. power source 45 so as to generate an A.C. magnetic field, which is applied in the thickness direction of the master recording medium 1 and magnetic recording medium 4. Under this condition, the master recording medium 1 and the magnetic recording medium 4 are moved relative to the electromagnets 41, 42 in the direction denoted by arrows 44 and 43.

Figure 6:
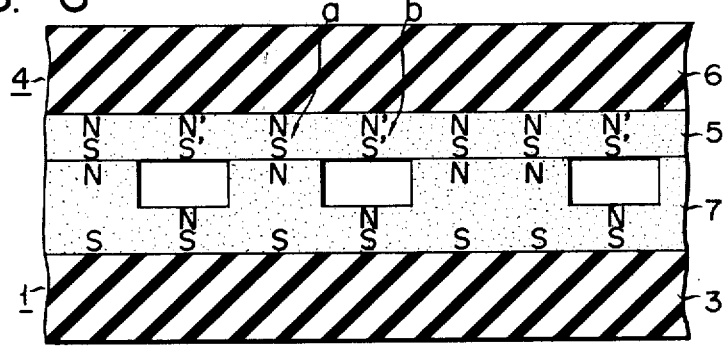
FIG. 6 is a sketch for explaining how information signals are transcription-recorded in the magnetic recording medium is the second embodiment mentioned.

It should be noted that the A.C. magnetic field generated by the electromagnets 41, 42 is concentrated mainly on the region a of the magnetic material layer 5, leading to a marked difference in the magnetic flux density between the regions a and b. As a result, the surfaces of the regions a and b of the magnetic material layer 5 are magnetized strongly and weakly, respectively, in the S-polarity, which is opposite to the N-polarity at the surface region of the magnetic material layer 7. FIG. 6 shows how the magnetic material layer 7 is magnetized. The symbols S and N represent a strong magnetization, with the symbols S' and N' representing a weak magnetization in the S-polarity.

In the second embodiment, the information signals recorded in a concave-convex pattern in the magnetic material layer 7 of the master recording medium 1 are magnetically transcribed recorded in the magnetic material layer 5 of the magnetic recording medium 4 in a magnetization pattern consisting of the strongly and weakly magnetized portions conforming with the concave-convex pattern.

As described previously, it is desirable in the second embodiment to use a ferromagnetic material with a large coercive force for forming the magnetic material layer 7 of the master recording medium 1 in order to enhance the transcription efficiency. The master recording medium used in the conventional magnetic transcription-recording method comprises a magnetic material layer in which information signals are magnetically recorded by using a magnetic head. If the magnetic material layer of the master magnetic recording medium used in the conventional method is formed of a ferromagnetic material, it is technically difficult to record the information signals magnetically in the magnetic material layer, particularly where it is intended to achieve the recording at a high density. In the second embodiment of this invention, however, the information signals are recorded in a concave-convex pattern in the magnetic material layer 7 of the master recording medium 1, rendering it possible to use a ferromagnetic material for forming the magnetic material layer 7.

Figure 7:
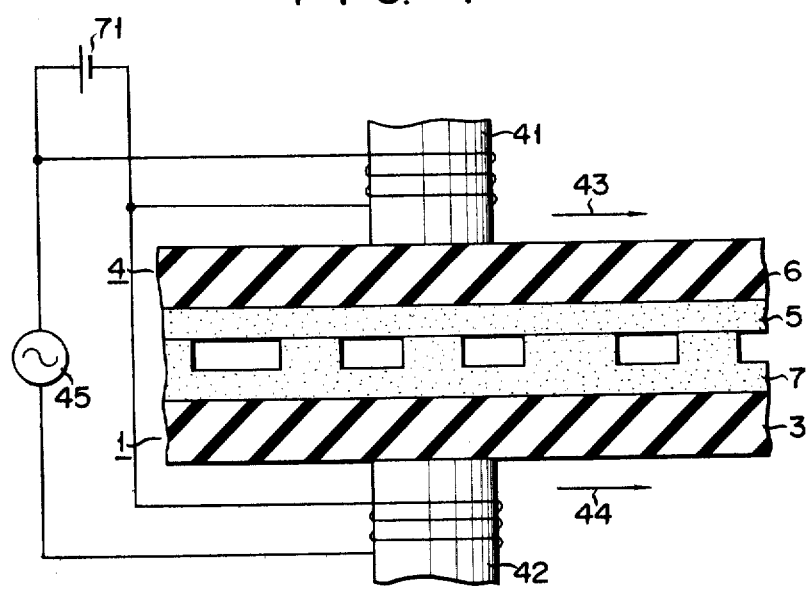
FIG. 7 is a sketch for explaining a magnetic transcription-recording method according to a third embodiment of this invention.

FIG. 7 is intended to explain a third embodiment of this invention, which is directed to a further inprovement of the second embodiment. The third embodiment differs from the second embodiment in that the electromagnets 41 and 42 are supplied during the transcription-recording step with a D.C. current generated from a D.C. power source 71 as well as with the A.C. current generated from the A.C. power source 45. Thus, a D.C. magnetic field is superposed on the A.C. magnetic field generated from the electromagents 41, 42. In the third embodiment, the D.C. current is supplied to the electromagnets 41, 42 such that those regions of the electromagnets 41, 42 which are in contact with the base layers 6 and 3 provide the N- and S-poles, respectively. If the intensity of the produced D.C. magnetic field is properly selected, polarity of the region b shown in FIG. 6 is renersed. Thus, the magnetic material layer 5 is imparted with a magnetization pattern consisting of the S- and N-polarities.

Figure 8:
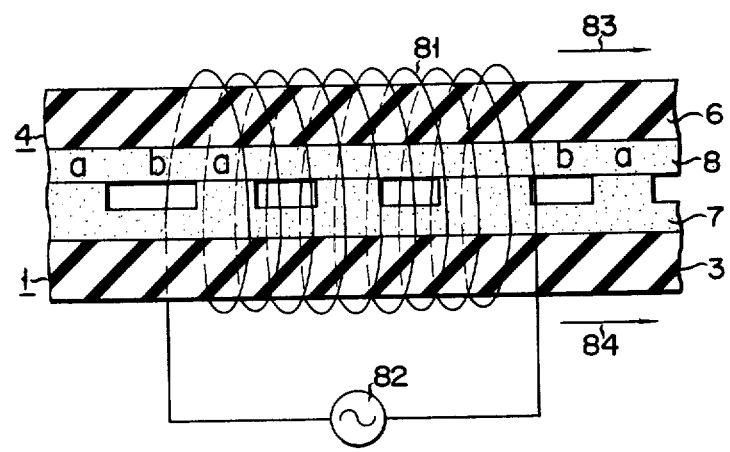
FIG. 8 is a sketch for explaining a magnetic transcription-recording method according to a fourth embodiment of this invention.

FIG. 8 is intended to explain a fourth embodiment of this invention. In each of the first to third embodiment, a magnetic field is applied in the thickness direction of the master recording medium 1 and the magnetic recording medium 4 for performing the transcription-recording. In the fourth embodiment, however, a magnetic field is applied in a direction perpendicular to the thickness direction, namely, applied in the planar direction (which is equal to the longitudinal direction of the recording track) for performing the transcription-recording. To be more specific, an A.C. current of high frequency generated from an A.C. power source 82 is supplied to a solenoid 81 so as to enable the solenoid 81 to generate an A.C. magnetic field of high frequency. The master recording medium 1 and the magnetic recording medium 4 are disposed within the solenoid 81 and are moved relative to the solenoid 81 in the longitudinal direction of the recording track as denoted by arrows 83, 84. As in the second and third embodiments, the magnetic material layer 7 of the master recording medium 1 is formed of a ferromagnetic material. Also, the magnetic material layer 7 is uniformly magnetized in advance in the thickness direction in a prescribed polarity as described previously in conjunction with FIG. 5.

In the fourth embodiment, the magnetic material layer 8 of the magnetic recording medium 4 is magnetized mainly by the action of the residual magnetism of the magnetic material layer 7 included in the master recording medium 1. If the magnetic material layer 7 is magnetized in the thickness direction in advance such that the concave-convex pattern-bearing surface exhibits, for example, the N-polarity, the magnetic material layer 8 is magnetized strongly in the region a and weakly in the region b in the S-polarity. In other words, the magnetic material layer 8 is magnetized to form a pattern conforming with the concave-convex pattern of the magnetic material layer 7.

The fourth embodiment is featured in that the A.C. magnetic field generated from the solenoid 81 acts on the magnetic material layer 8 as a bias magnetic field in the transcription-recording step. Because of the action of the bias magnetic field, the magnetic material layer 8 is magnetized in a sharply inclined region of the magnetization characteristic curve representing the relationship between the magnetic field intensity and the magnetization intensity of the magntic material layer 8. It follows that the difference in magnetization intensity is increased between the regions a and b of the magnetic material layer 8 and, thus, the transcription-recording can be performed efficiently.

Figure 9:
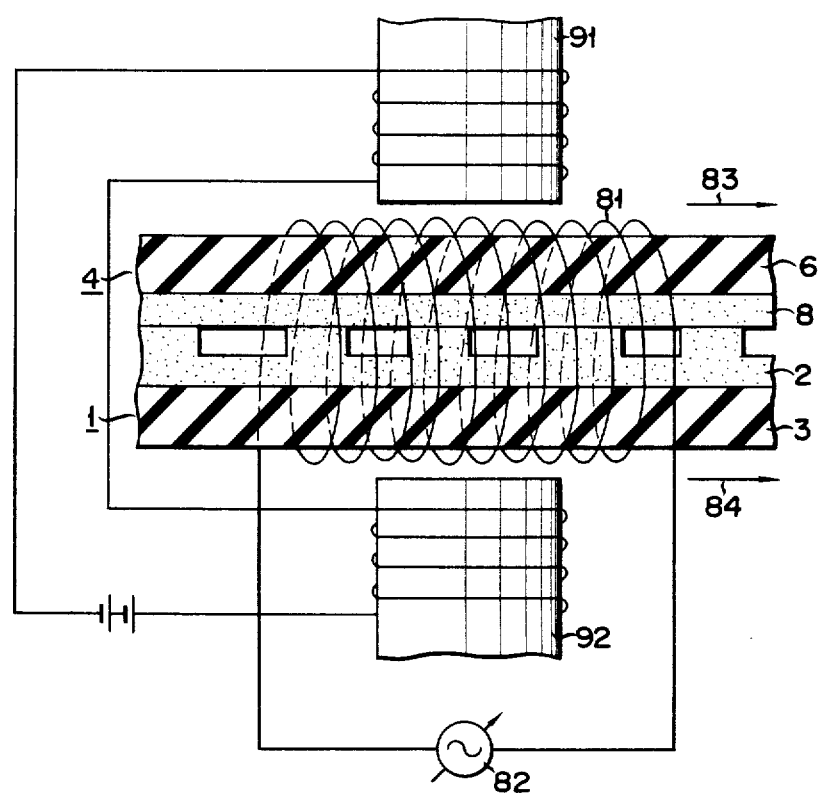
FIG. 9 is a sketch for explaining a magnetic transcription-recording method according to a fifth embodiment of this invention.

FIG. 9 is intended to explain a fifth embodiment of this invention. The fifth embodiment differs from the fourth embodiment in that a D.C. magnetic field is applied in the thickness direction of the master recording medium 1 and the magnetic recording medium 4 by using magnets 91 and 92 as in the embodiment of FIG. 1 instead of magnetizing in advance the magnetic material layer 2 of the master recording medium 1. Also, a ferromagnetic material is not necessarily used for forming the magnetic material layer 2.

It is desirable in the fifth embodiment that the A.C. magnetic field generated by the solenoid 81 be applied earlier in the planar direction of the recording media 1 and 4, be gradually attenuated, and be extinguished earlier than the D.C. magnetic field applied in the thickness direction by the magnets 91 and 92. If controlled in this fashion, the A.C. magnetic field is enabled to perform the function of bias magnetic field and the erasing function. Thus, it is possible to perform the transcription-recording at a good S/N ratio even if undersired signals have already been recorded in the magnetic material layer 8 of the magnetic recording medium 4 or the magnetic material layer 8 has already been magnetized.

It is possible to use a magnetic head in place of the solenoid 81 for applying an A.C. magnetic field in the planar direction of the recording media 1 and 4.

In the embodiment described above, the master recording medium and the magnetic recording medium are moved relative to the magnetic field generating means in the transcription-recording step. However, it is possible to use a magnetic field generating means large enough to cover the entire region of the recording media so as to omit the relative movement and, thus, to perform the transcription-recording in an extremely short time. For example, where the recording media are of disc shape, it is possible to use as the means for generating a magnetic field in the thickness direction magnets each having a magnetic pole plane substantially equal in area to the disc. Where the recording media are of tape shape, the master recording medium and the magnetic recording medium are laminated each other and the laminate is formed into a roll. Then, a magnetic field is applied to the entire region of the roll.

In the second to fourth embodiments, it is necessary to magnetize in advance the magnetic material layer of the master recording medium. Thus, the transcription efficiency is lowered in accordance with decrease in the residual magnetism of the magnetic material layer. In this case, however, the magnetic material layer of the master recording medium can be magnetized again so as to permit repeatedly performing the transcription-recording satisfactorily as in the first and fifth embodiments. Industrial Applicability:

The magnetic transcription-recording method of this invention is useful as a transcription-recording method for reproducing from a single master recording medium a number of magnetic recording media each having information signals such as audio signals or video signals recorded therein at a high density and each permitting the information signals to be reproduced easily by using a simple magnetic reproducing apparatus.

I claim:

1. A magnetic transcription-recording method, in which a magnetic material layer of a magnetic recording mdium is brought into contact with the magnetic material layer of a master recording medium having information signals recorded therein in a pattern of projections, and a magnetic field is applied to the master recording medium and the magnetic recording medium so as to transcribe and record magnetically the information signals in the magnetic material layer of the magnetic recording medium, wherein said magnetic field includes an AC magnetic field and a DC magnetic field, said AC magnetic field is applied in a direction perpendicular to an oriented direction of said magnetic material layer of said magnetic recording medium, and said DC magnetic field is applied in said oriented direction.

2. A magnetic transcription-recording method according to claim 1, wherein said magnetic material layer of said magnetic recording medium is oriented in the thickness direction, and said DC magnetic field is applied in the thickness direction.

3. A magnetic transcription-recording method according to claim 2, wherein said magnetic material layer of said magnetic recording medium is oriented in the thickness direction, and said DC magnetic field is applied in the thickness direction.

4. A magnetic transcription-recording method according to claim 2, wherein said magnetic material layer of said magnetic recording medium is uniformly magnetized in advance in the direction opposite to that achieved by the magnetization by the DC magnetic field.

5. A magnetic transcription-recording method according to claim 1, wherein said magnetic material layer of said magnetic recording medium is oriented in a direction perpendicular to the thickness direction, and said DC magnetic field is applied in said oriented direction of the last mentioned magnetic material layer.

6. A magnetic transcription-recording method according to claim 5, wherein said magnetic material layer of said magnetic recording medium is oriented in the thickness direction, and said DC magnetic field is applied in the thickness direction.

7. A magnetic transcription-recording method according to claim 5, wherein said magnetic material layer of said magnetic recording medium is uniformly magnetized in advance in the direction opposite to that achieved by the magnetization by the DC magnetic field.

8. A magnetic transcription-recording method according to claim 1, wherein said AC magnetic field is applied earlier to the master recording medium and magnetic recording medium, is gradually attenuated, and is extinguished earlier than the DC magnetic field.

9. A magnetic transcription-recording method according to claim 1, wherein said magnetic material layer of said magnetic recording medium is uniformly magnetized in advance in the direction opposite to that achieved by the magnetization by the DC magnetic field.

* * * * *